US008511399B2

(12) United States Patent
Kunz

(10) Patent No.: US 8,511,399 B2
(45) Date of Patent: Aug. 20, 2013

(54) HAMMER DRILL WITH MODE LOCK ON

(75) Inventor: Michael Kunz, Dorndorf (DE)

(73) Assignee: Black & Decker Inc., Newark, DE (US)

( * ) Notice: Subject to any disclaimer, the term of this patent is extended or adjusted under 35 U.S.C. 154(b) by 857 days.

(21) Appl. No.: 11/232,667

(22) Filed: Sep. 22, 2005

(65) Prior Publication Data

US 2006/0060365 A1 Mar. 23, 2006

(30) Foreign Application Priority Data

Sep. 22, 2004 (GB) .................................. 4255746.2

(51) Int. Cl.
*B23B 45/00* (2006.01)

(52) U.S. Cl.
USPC ............. 173/48; 173/217; 173/170; 173/171; 200/43.01

(58) Field of Classification Search
USPC .................... 173/217, 170, 171, 48; 200/522, 200/43.17, 321, 332.2, 43.11, 43.12, 43.18, 200/325, 43.01, 43.13
See application file for complete search history.

(56) References Cited

U.S. PATENT DOCUMENTS

| | | | | |
|---|---|---|---|---|
| 1,596,013 | A | | 8/1926 | Gebhardt |
| 1,828,903 | A | | 10/1931 | Moretti |
| 2,283,778 | A | | 5/1942 | Wilhide |
| 3,646,298 | A | | 2/1972 | Weber et al. |
| 3,781,579 | A | | 12/1973 | Rosenthal |
| 3,847,233 | A | | 11/1974 | Glover et al. |
| 3,854,020 | A | | 12/1974 | Glover et al. |
| 4,023,001 | A | | 5/1977 | Lafferty |
| 4,044,215 | A | | 8/1977 | Leibinger et al. |
| 4,097,703 | A | * | 6/1978 | Houser ........................ 307/126 |
| 4,271,342 | A | | 6/1981 | Sistare |
| 4,296,290 | A | | 10/1981 | Peot |
| 4,592,144 | A | | 6/1986 | Tolbert et al. |
| 4,879,438 | A | | 11/1989 | Winchester |
| 5,105,130 | A | | 4/1992 | Barker et al. |
| 5,136,130 | A | | 8/1992 | Daly |
| 5,223,770 | A | | 6/1993 | Schlessmann |
| 5,428,197 | A | | 6/1995 | McCurry et al. |
| 5,638,945 | A | | 6/1997 | Fukinuki et al. |
| 5,653,296 | A | * | 8/1997 | Fujiyama ...................... 173/217 |
| 5,724,737 | A | * | 3/1998 | Stones ............................ 30/228 |
| 6,109,364 | A | | 8/2000 | Demuth et al. |
| 6,169,258 | B1 | | 1/2001 | Roney et al. |

(Continued)

FOREIGN PATENT DOCUMENTS

| | | |
|---|---|---|
| GB | 2314288 | 12/1997 |

*Primary Examiner* — Michelle Lopez
(74) *Attorney, Agent, or Firm* — Kofi Schulterbrandt; Scott B. Markow; Adan Ayala

(57) ABSTRACT

A hammer drill, in particular a chipper comprises: a body having at least one support handle; an electric motor mounted within the body; an electric switch, capable of being switched on and off by a trigger button connected to it, to activate or deactivate respectively the electric motor, wherein the trigger button is moveable between two positions, a first position where the electric switch is off and a second position where the electric switch is on; a locking arm moveably mounted on the electric switch which, when the trigger button is located in its second position, is moveable between two positions, a first position where it is disengaged from the trigger button and a second position where it engages with the trigger button and holds the trigger button in its second position. When the locking arm is in its second position it causes the hammer to remain switch on even if the operator removes their fingers from the trigger button.

17 Claims, 11 Drawing Sheets

U.S. PATENT DOCUMENTS 6,176,321 B1 1/2001 Arakawa et al.
6,274,828 B1 * 8/2001 Chu ........................... 200/43.17
6,355,892 B1 3/2002 Marks
6,469,269 B1 10/2002 Jong
6,489,578 B1 * 12/2002 Jung et al. .................. 200/332.2
6,550,545 B1 4/2003 Manschitz et al.
6,555,773 B1 * 4/2003 Broghammer et al. .... 200/61.85
6,725,944 B2 4/2004 Berger
6,742,601 B2 6/2004 Numata
6,749,028 B1 * 6/2004 Chan et al. .................... 173/170
6,766,868 B2 7/2004 Frauhammer et al.
6,878,888 B1 * 4/2005 Jong .......................... 200/43.17
6,938,706 B2 * 9/2005 Ng ................................ 173/216
6,989,503 B2 * 1/2006 Wong ............................ 200/522
7,021,399 B2 * 4/2006 Driessen ......................... 173/29
7,044,234 B2 5/2006 Manschitz et al.
D528,393 S * 9/2006 Stirm ............................... D8/69

* cited by examiner

HAMMER DRILL WITH MODE LOCK ON

FIELD OF THE INVENTION

The present invention relates to a hammer drill and in particular, a chipper.

BACKGROUND OF THE INVENTION

A chipper is a power tool which is used to chisel a workpiece such a block of stone. Typically, such chippers are powered by an electric motor which are either powered by a mains electricity power supply or by a battery. A tool bit, usually in the form of a chisel, is mounted in a tool holder located at the front of the chipper. The tool holder prevents the tool bit from rotation. However, the tool bit is capable of axially sliding within the tool holder over a limited range of movement.

The electric motor is activated by depression of the trigger switch which is usually mounted on a handle attached to the body of the chipper. The electric motor reciprocatingly drives a striker via gears, a rotary to linear movement conversion mechanism, typically a crank or wobble bearing, and an air spring, typically in the form of a piston, cylinder and ram, mounted within the chipper in well-known manner. The striker repeatedly hits the end of the drill bit located within the tool holder causing the tool bit to be repeatedly driven forwards. In use, the cutting tip the tool bit is placed against the work piece to be chiseled. The striker repeatedly hits end of the tool bit within the tool holder, causing tool bit to chip or chisel away at the work piece.

Ideally, such chippers can operate in two modes of operation.

BRIEF SUMMARY OF THE INVENTION

The first mode of operation is where depression of the trigger switch by an operator causes the motor to be activated. The operator can then use the chipper whilst the trigger switch remains depressed. In order to keep the electric motor activated, the operator must keep the trigger switch depressed. Upon release of the trigger switch, the electric motor is deactivated and the chipper is switched off.

In the second mode of operation, the chipper can be “locked on”. This means that once the trigger switch has been depressed and the electric motor activated, the chipper can be “locked on” so that the electric motor remains constantly activated even when the operator releases the trigger switch. This enables the operator to move their hands around the handle and body of the chipper to support it in different places whilst the chipper remains activated. Once the operator wishes to stop the chipper, the “lock on” is switched off, allowing the electric motor to be deactivated when the trigger switch is released. If the “lock on” is switched off whilst the trigger switch is not depressed, the motor stops immediately.

Accordingly there is provided a hammer drill comprising:

a body having at least one support handle;

an electric motor mounted within the body;

an electric switch, capable of being switched on and off by a trigger button connected to it, to activate or deactivate respectively the electric motor, wherein the trigger button is moveable between two positions, a first position where the electric switch is off and a second position where the electric switch is on;

a locking arm moveably mounted on the electric switch which, when the trigger button is located in its second position, is moveable between two positions, a first position where it is disengaged from the trigger button and a second position where it engages with the trigger button 8 and holds the trigger button in its second position.

Though the embodiment below relates to a chipper, it is clear to a person skilled in the art that the invention is applicable to any type of hammer drill.

BRIEF DESCRIPTION OF THE DRAWINGS

An embodiment of the present invention will now be described with reference to the accompanying drawings of which.

DETAILED DESCRIPTION OF THE INVENTION

Figure 1:
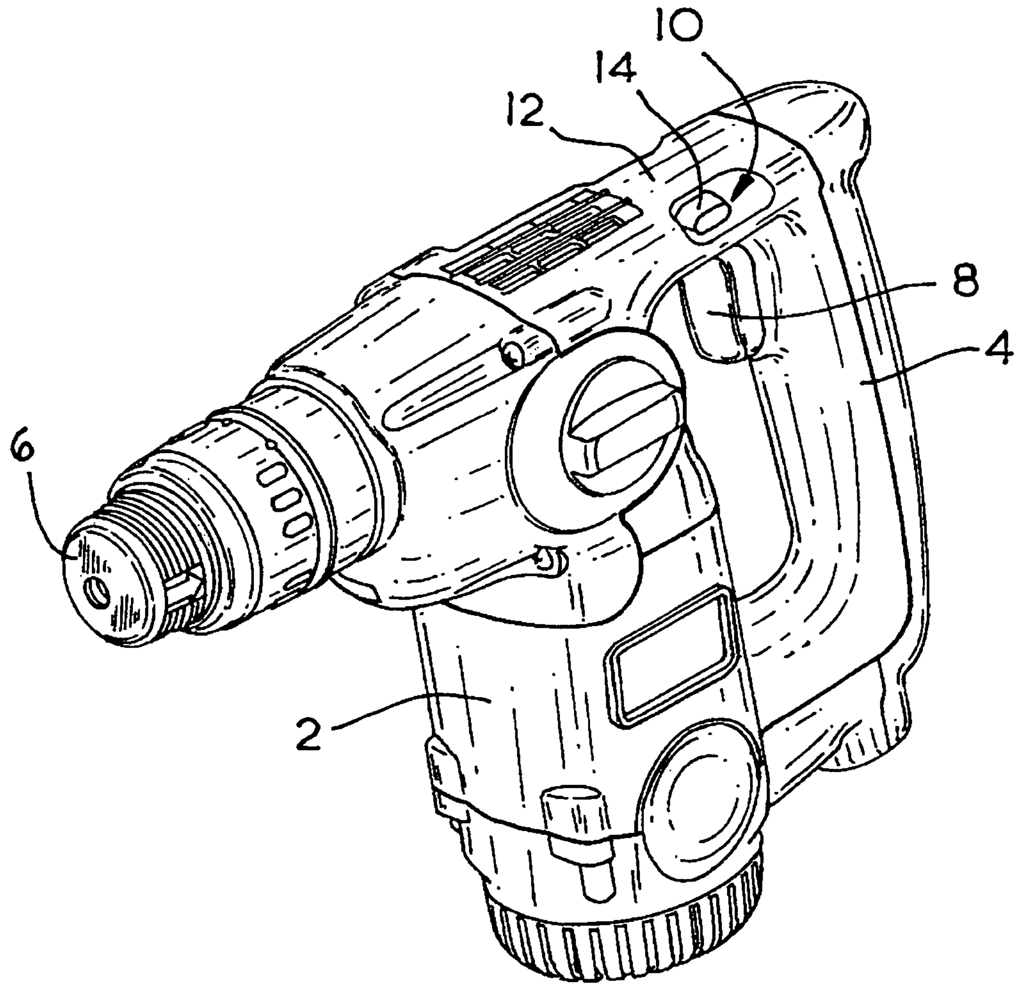
FIG. 1 shows a front perspective view of a hammer drill.
Figure 2:
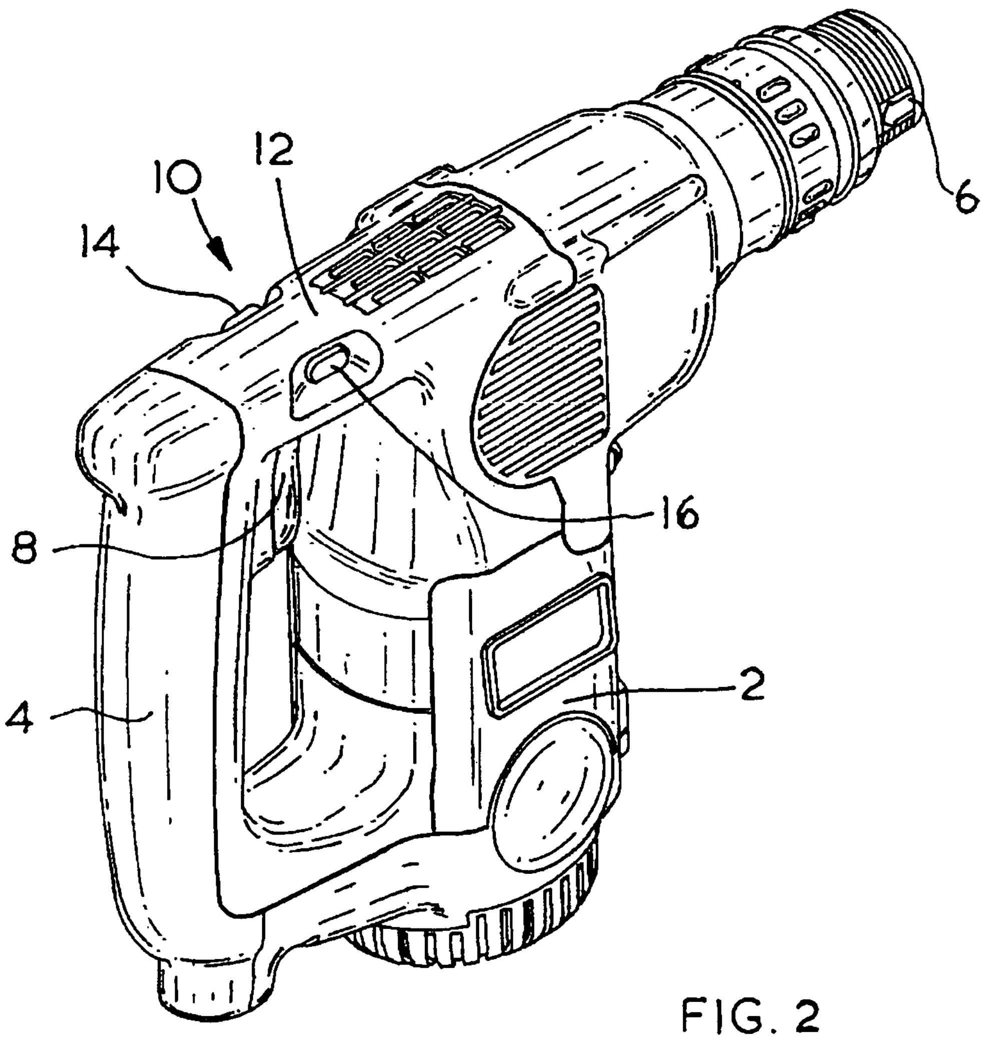
FIG. 2 shows a rear perspective view of a hammer drill

Referring to FIGS. 1 and 2, the chipper comprises a body 2 attached to the rear of which is a rear support handle 4. An electric motor (not shown) is mounted within the body. The electric motor is powered by a mains electricity power supply (not shown).

Mounted on the front of the body 2 of chipper is a tool holder 6. A chisel (not shown) can be mounted in the tool holder 6. The tool holder prevents the chisel from rotation. However, the chisel is capable of axially sliding within the tool holder 6 over a limited range of movement.

The electric motor is activated by depression of a trigger button 8 which is mounted on the inside of the rear support handle 4. The electric motor reciprocatingly drives a striker (not shown) via gears (not shown) and a wobble bearing (not shown) and an air spring in the form of a piston, cylinder and ram (not shown) mounted within the body 2 of the chipper in well-known manner. The striker repeatedly hits the end of a chisel located within the tool holder 6 causing the chisel to be repeatedly driven forwards. In use, the cutting tip the chisel is placed against the work piece to be chiseled. The striker repeatedly hits end of the chisel within the tool holder 6, causing chisel bit to chip or chisel away at the work piece.

The chipper can operate in two modes of operation.

The first mode of operation is where depression of the trigger button 8 by an operator causes the motor to be activated. The operator can then use the chipper whilst the trigger button 8 is depressed. In order to keep the electric motor activated, the operator must keep the trigger button 8 depressed using their fingers. Upon release of the trigger button, the electric motor is deactivated and the chipper is switched off.

In the second mode of operation, the chipper can be “locked on”. This means that once the trigger button 8 has been depressed and the electric motor activated, the chipper can be "locked on" so that the electric motor remains constantly activated even when the operator releases the trigger button 8. This enables the operator to move their hands around the body 2 and rear support handle 4 of the chipper to support it in different places whilst the chipper remains activated. Once the operator wishes to stop the chipper, the "lock on" is switched off, allowing the electric motor to be deactivated when the trigger button 8 is released.

The "lock on" is switched on by the sliding movement of a sliding "lock on" activator 10. The sliding "lock on" activator comprises a bar which is located within the top section 12 of the rear support handle 4 and which extends through the sides of the rear clamshell which forms the rear support handle 4. One end 14 of the bar extends through an aperture formed in one side (shown in FIG. 1) of the rear support handle 4, the other end 16 extends through a second aperture formed in the opposite side (shown in FIG. 2) of the rear support handle 4, the two ends 14, 16 being visible externally whilst the centre section of the bar remains internally within the top section 12 of the rear support handle 4. The bar can slide axially within the top section 12 of the rear support handle across the width of the rear support handle 4 from a first position where one end 14 projects substantially from one side of the chipper to a second position where the other end 16 projects substantially from the other side of the chipper, and then back to the first position.

The mechanism by which the chipper is "locked on" will now be described in detail with reference to FIGS. 3 to 11.

Figure 3:
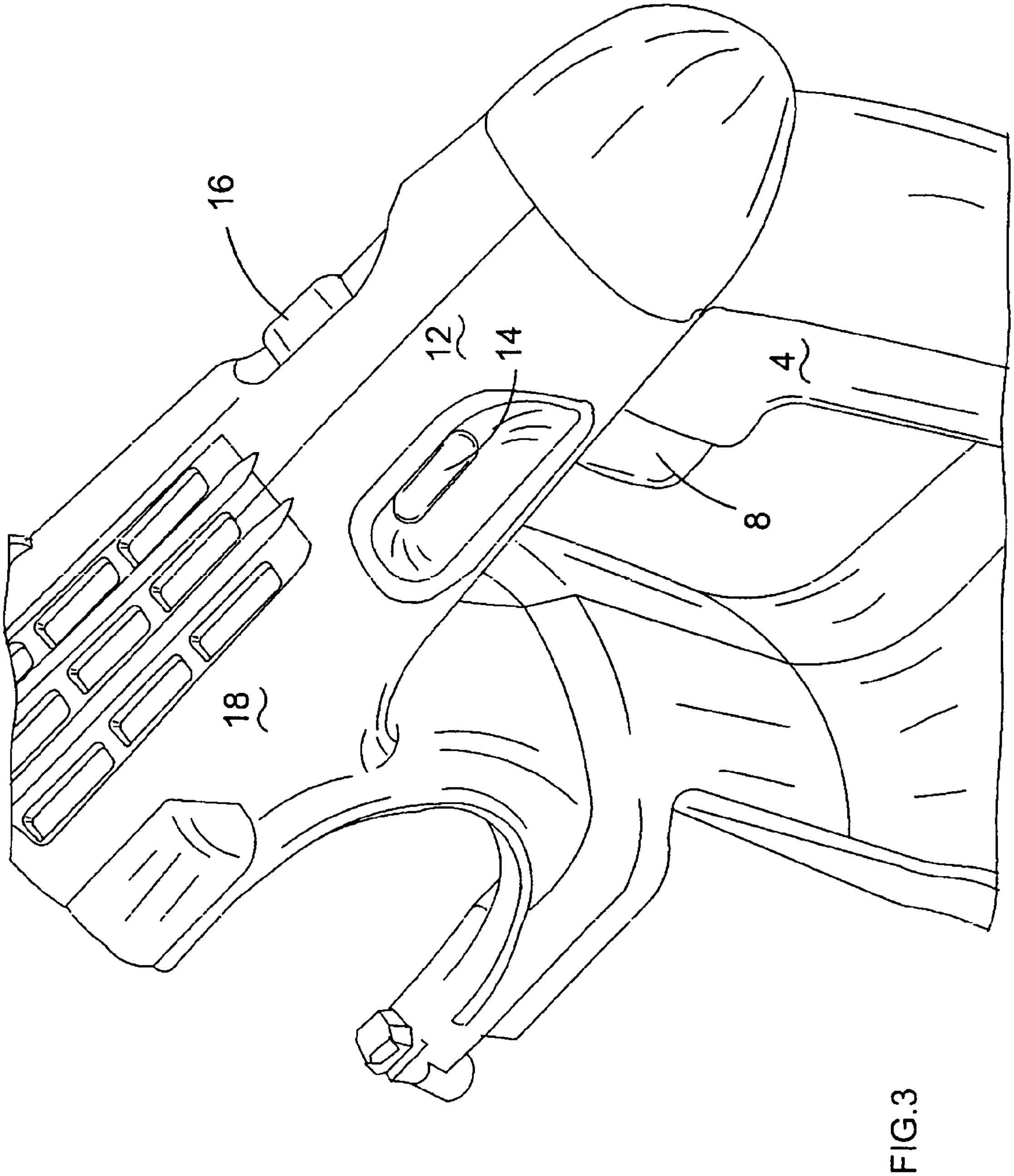
FIG. 3 shows the rear clam shell of the chipper with the sliding “lock on” activator.
Figure 4:
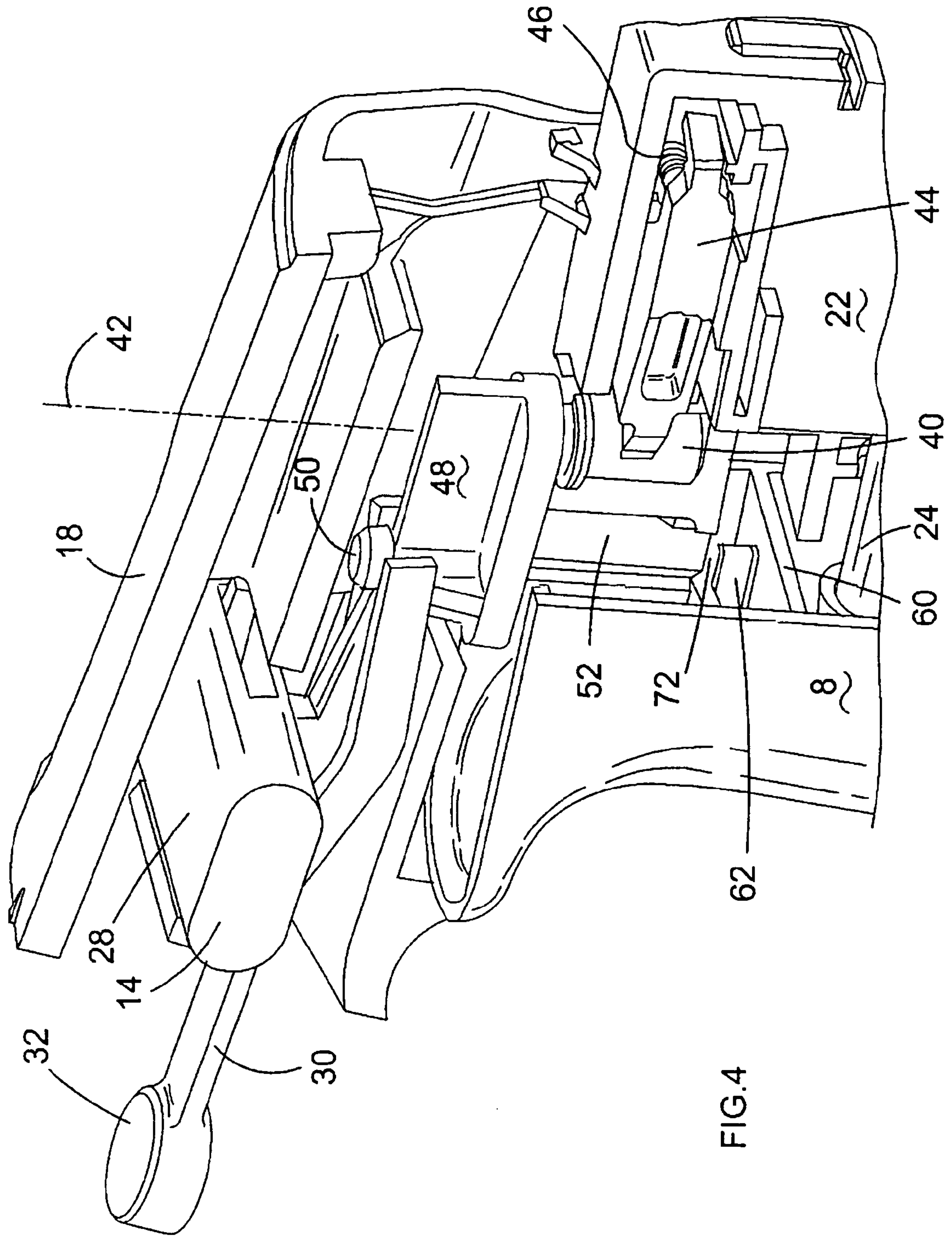
FIG. 4 shows part of the rear clam shell with the electric switch, the trigger button, the pivotal latch and the sliding “lock on” activator.

Referring to FIG. 3, the rear support handle is formed from a plastic clamshell 18. Mounted within the rear support handle 4 is an electric switch 22 as best seen in FIG. 4. Connected to the electric switch 22 is the trigger button 8. The trigger button 8 connects to the electric switch 22 via an elongate rod 24 of circular cross-section. The elongate rod 24 is capable of being axially slid along its elongate axis over a limited range of movement. Depression of the trigger button 8, so that it moves into the rear support handle 4, causes the elongate rod 24 to move along its elongate axis and be pushed into the body of the electric switch 22 causing the electric switch to make an electrical connection thus allowing electric current to pass through it which in turn activates the electric motor.

Figure 6:
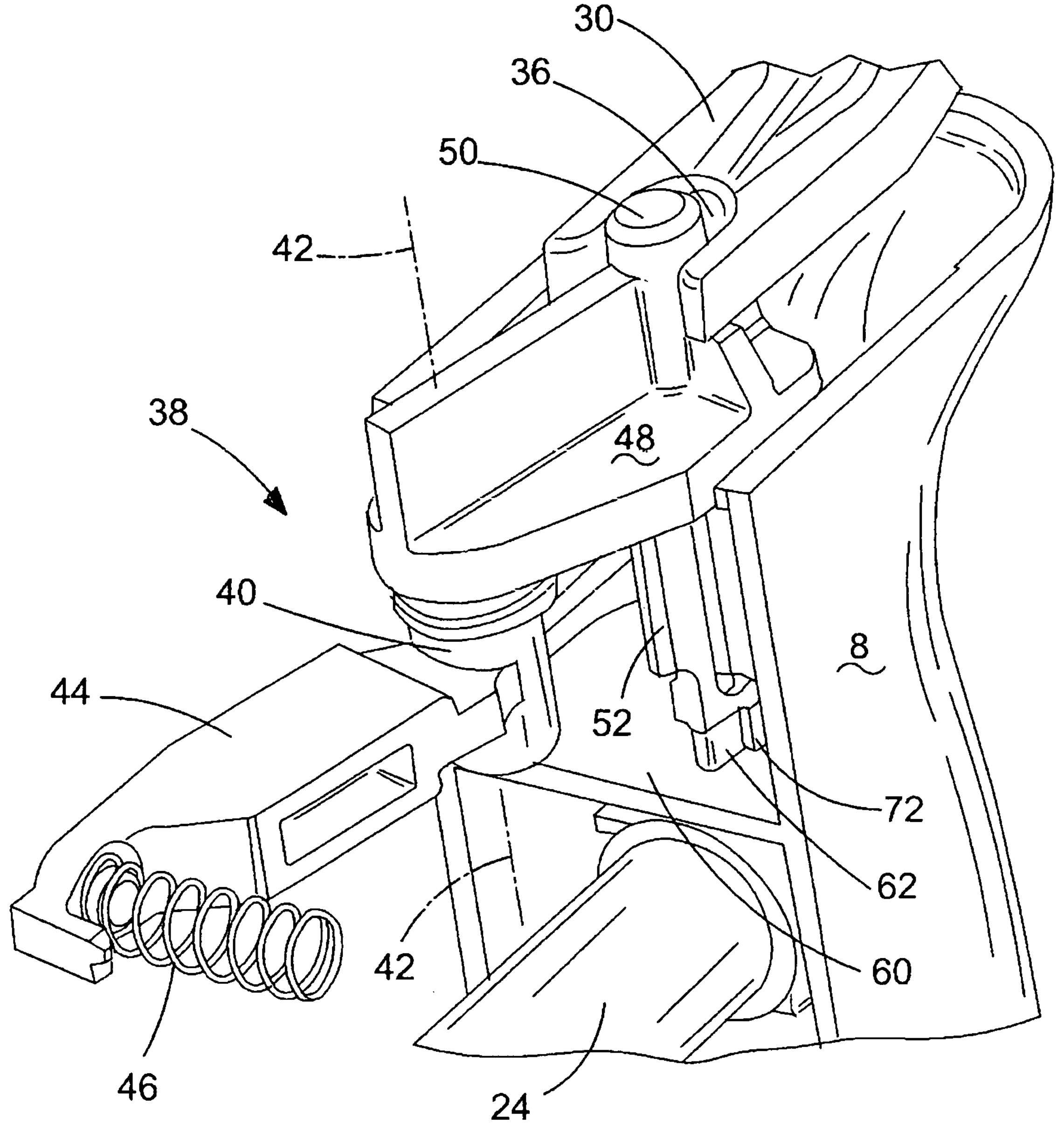
FIG. 6 shows the trigger button, the pivotal latch with biasing spring.
Figure 8:
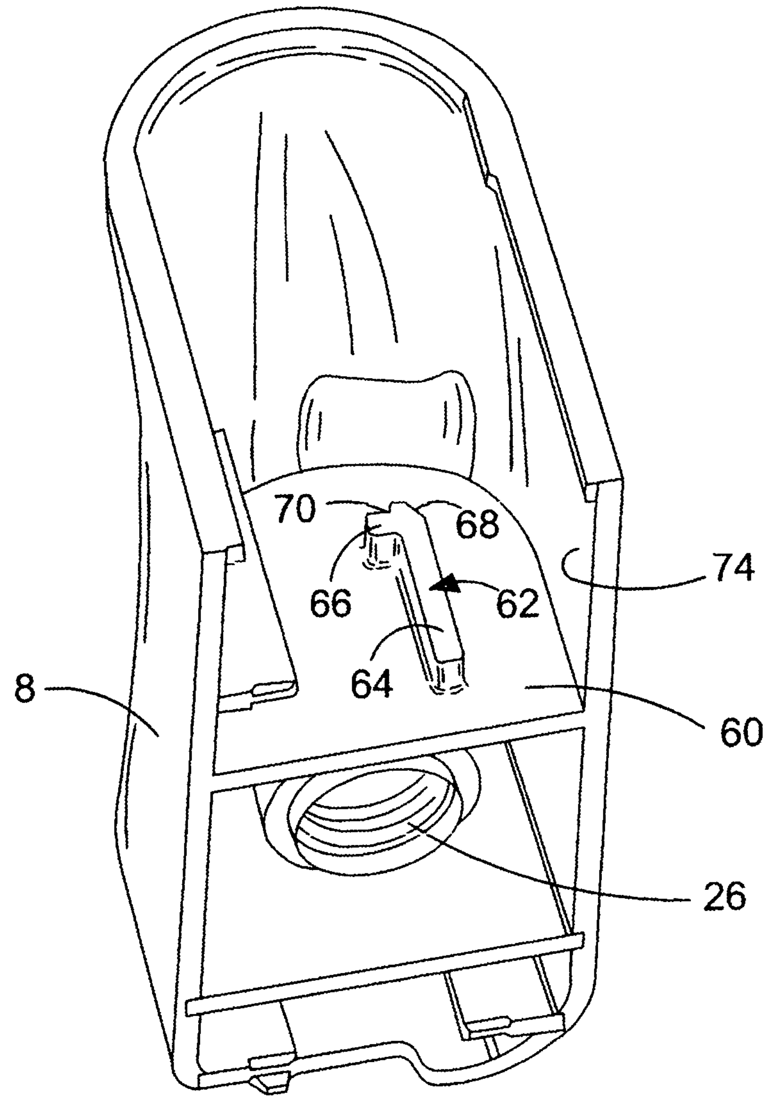
FIG. 8 shows the inside of the trigger button with the catch.

FIG. 6 shows the elongate rod 24 connecting into the rear of the trigger button 8. FIG. 8 shows a rear view of the trigger button 8 together with a recess 26 of circular cross section in which the end of the elongate rod 24, which projects from the electric switch 22, locates and connects to the trigger button 8. The elongate rod is biased outwardly from the body of the electric switch 22 via a spring (not shown) within the electric switch 22 to a maximum outward position. When the elongate rod 24 extends to its maximum position due to the biasing force of the spring, the electric switch 22 is switched off, with no electric current being able to pass through the switch 22. Depression of the trigger button 8 moves the elongate rod 24 against the biasing force of the spring into the body of electric switch 22 switching the electric switch 22 on.

The sliding "lock on" activator 10 will now be described in detail.

Figure 5:
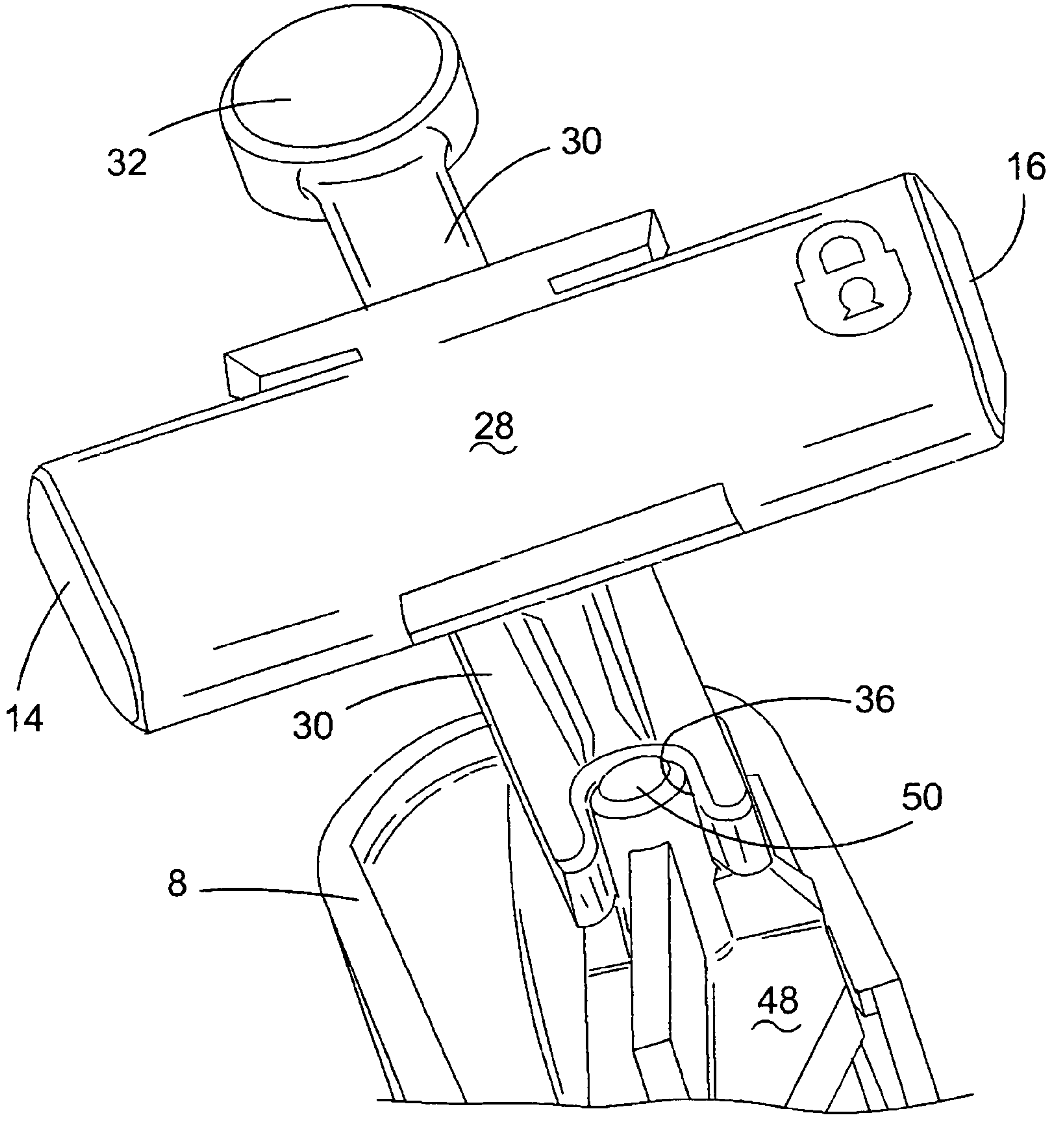
FIG. 5 shows the trigger button, the pivotal latch and the sliding “lock on” activator.

The sliding "lock on" activator (indicated by reference number 10 in FIG. 1) comprises a bar as best seen in FIGS. 4 and 5 which has a central section 28, and two ends 14, 16. The bar, as described previously, extends through the top section 12 of the rear support handle 4, the two ends 14, 16 projecting through apertures formed in the clamshell 18 which forms the rear support handle 4. The bar is capable of sliding within the clam shell 18 into and out of the apertures, along its longitudinal axis.

The bar is mounted transversely across a support rod 30, the longitudinal axis of the bar being substantially perpendicular to that of the support rod 30. When the sliding "lock on" activator 10 is mounted within the top section 12 of the rear support handle 4, both the longitudinal axes of the support rod 30 and of the bar are substantially horizontal. The bar is mounted part way along the length of the support rod 30 as shown in the FIGS. 4 and 5.

The movement of the bar and support rod 30 is controlled by the bar which is capable of sliding along its longitudinal axis only. Thus the support rod 30 is only capable of sliding width ways, horizontally from left to right within the clam shell 18. The support rod 30 limits the amount of sliding movement of the bar 28.

Attached to one end of the support rod 30 is a circular disk 32 as shown. The circular disk 32 is provided as a grip by which a person assembling the chipper can hold the "lock on" mechanism during production. The circular disk performs no function in the operation of the "lock on" mechanism when the tool is assembled.

Formed in the other end of the support rod 30 opposite to that to which the circular disk 32 is attached, is a U-shaped recess 36.

The sliding "lock on" activator 10 comprising the bar, the support rod 30 with the U-shaped recess 36 and circular disk 32 are formed from plastic in a one-piece construction.

The pivotal latch 38 with biasing spring 46 will now be described in detail with reference to the figures.

The pivotal latch is best seen in FIG. 6. The pivotal latch comprises a central pivot mount 40 of circular cross-section about the longitudinal axis 42 of which the pivotal latch 38 is capable of pivoting.

Extending from one side of the pivot mount 40 substantially perpendicular to the longitudinal axis 42 of the pivot mount 40, is a first arm 44. Attached to the side of the first arm 44 is a helical spring 46 the axis of which extends substantially perpendicular to the longitudinal axis of the first arm 44 and to the longitudinal axis 42 of the pivot mount 40.

Extending from the other side of the pivot mount 40 in the opposite direction to the first arm 44 is a second arm 48. The second arm 48 extends in a direction which is substantially parallel to the first arm 44. Mounted on the topside of the second arm 48, towards the end of the second arm 48, remote from the pivot mount 40, is a drive peg 50. The drive peg 50 is substantially circular in cross-section and extends in a direction parallel to that of the longitudinal axis 42 of the pivot mount 40. Mounted on the underside of the second arm 48 towards the end of the second arm 48 remote from the pivot mount 40, is a latch arm 52. The latch arm 52 extends downwardly in the opposite direction to the drive peg 50 but substantially parallel to it.

Figure 7:
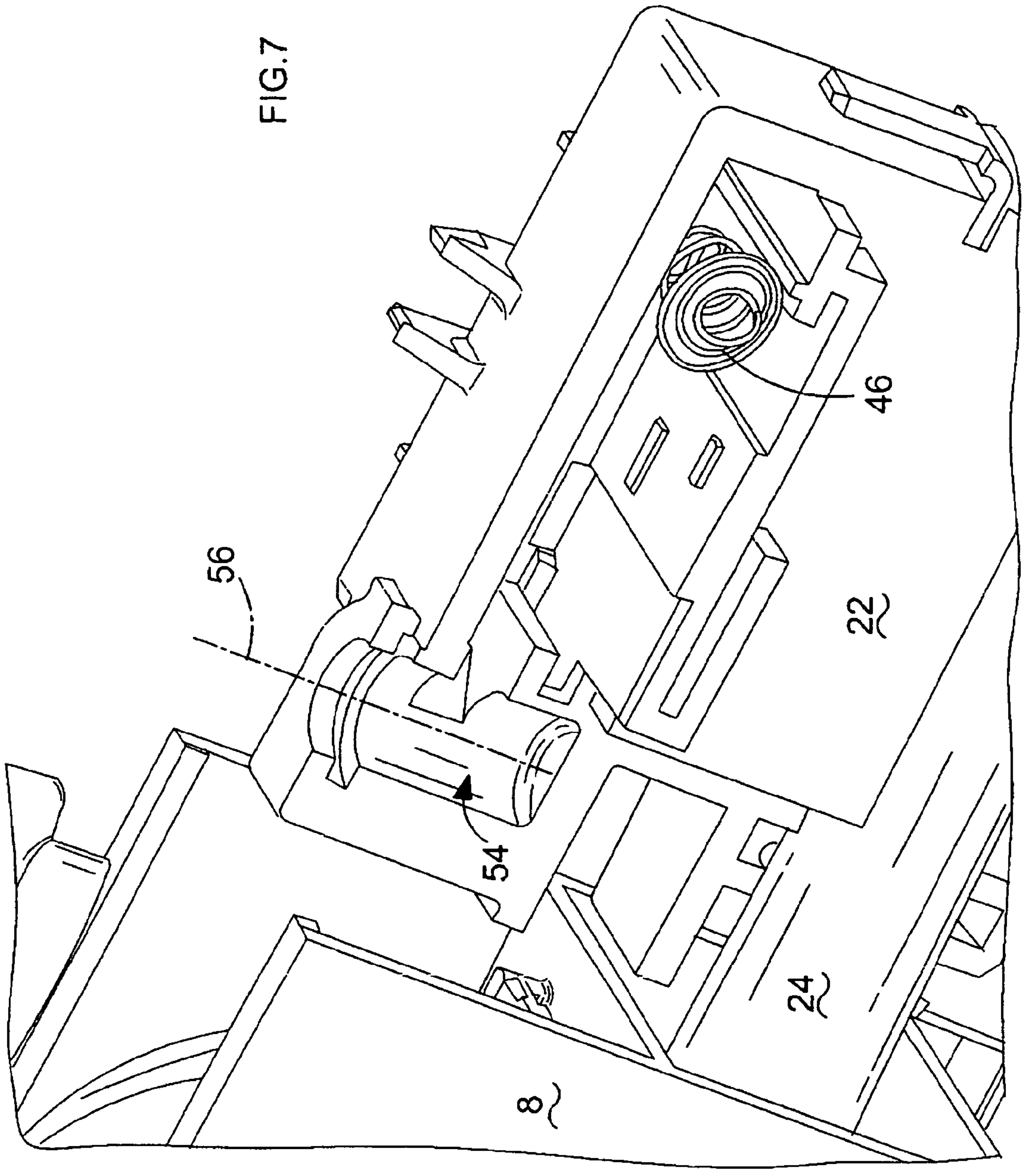
FIG. 7 shows the electric switch and the trigger button.

Referring to FIG. 7, the top of the body of the electric switch 22 comprises a tubular recess 54 of circular cross-section. The longitudinal axis 56 of the tubular recess 54 is vertical.

The underside of the pivot mount 40 locates within the tubular recess 54 of the electric switch 22 such that the two axes 42, 56 are coaxial. The pivotal latch 38 is capable of pivoting about the longitudinal axis 42 of the pivot mount 40 within the tubular recess 54 of electric switch 22. The free end of the helical spring 46 which is attached to the first arm 44 attaches to the side of the body of electric switch 22 as shown in FIG. 7. The helical spring 46 biases the end of the first arm 44 away from the side of the body of the switch 22.

The drive peg 50 mounted on the topside of the second arm 48 locates within the U-shaped recess 36 formed in the support rod 30 of the "lock on" activator as best seen in FIG. 4.

When an operator slides the bar 28 of the "lock on" activator 10, the "lock on" activator 10 slides width ways within the clam shell 18 causing the U-shaped recess 36 formed in the end of the support rod 30 to move from left-to-right (or vice-versa). This in turn causes the drive peg 50 which is located within the U shaped recess 36 to move from left-to-right (or vice versa) as shown in FIG. 6 causing the pivotal latch 38 to pivot about the longitudinal axis 42 of the pivot mount 40. Movement of the pivotal latch 38 causes compression or expansion of the helical spring 46 connected between the first arm 44 the pivotal latch 38 on the body of the electrical switch 22.

The pivotal latch 38 is made from plastic in a one piece construction.

Referring to FIG. 8, it can be seen that the trigger button 8 is hollow. A horizontal shelf 60 is formed across the width of the inside of the trigger button 8 approximately halfway up within the trigger button 8. Formed on the top surface of the shelf 60 is a catch 62. The catch 62 comprises an elongate ridge 64 which extends forward within the trigger button 8. Formed adjacent to one end of the elongate ridge 64 is a second smaller ridge 66 which extends sideways, perpendicular to that of the elongate ridge 64. A chamfer 68 is formed on the corner of the elongate ridge 64 at the same end as that from which the smaller ridge 66 extends, on the opposite side from that which the smaller ridge 66 extends. The junction of the smaller ridge 66 and the forward end of the elongate ridge 62 forms a recess 70.

Figure 9:
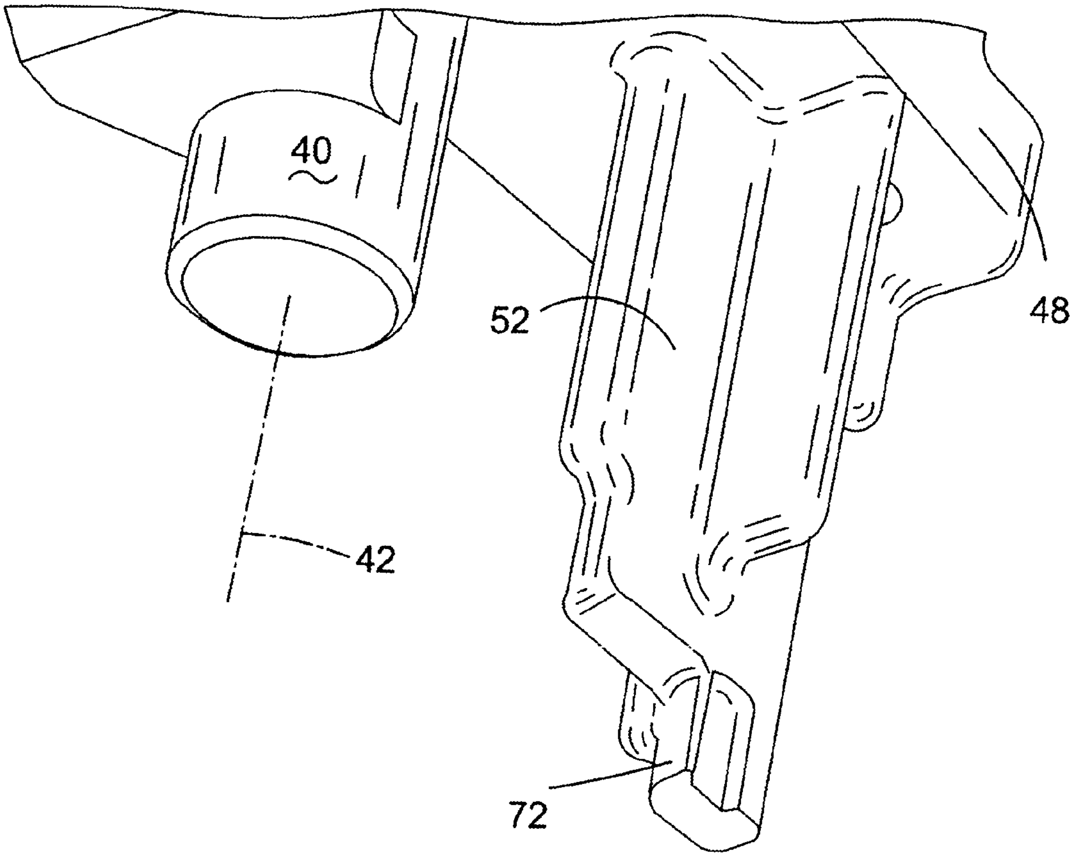
FIG. 9 shows the underside of the sliding “lock on” activator.
Figure 10:
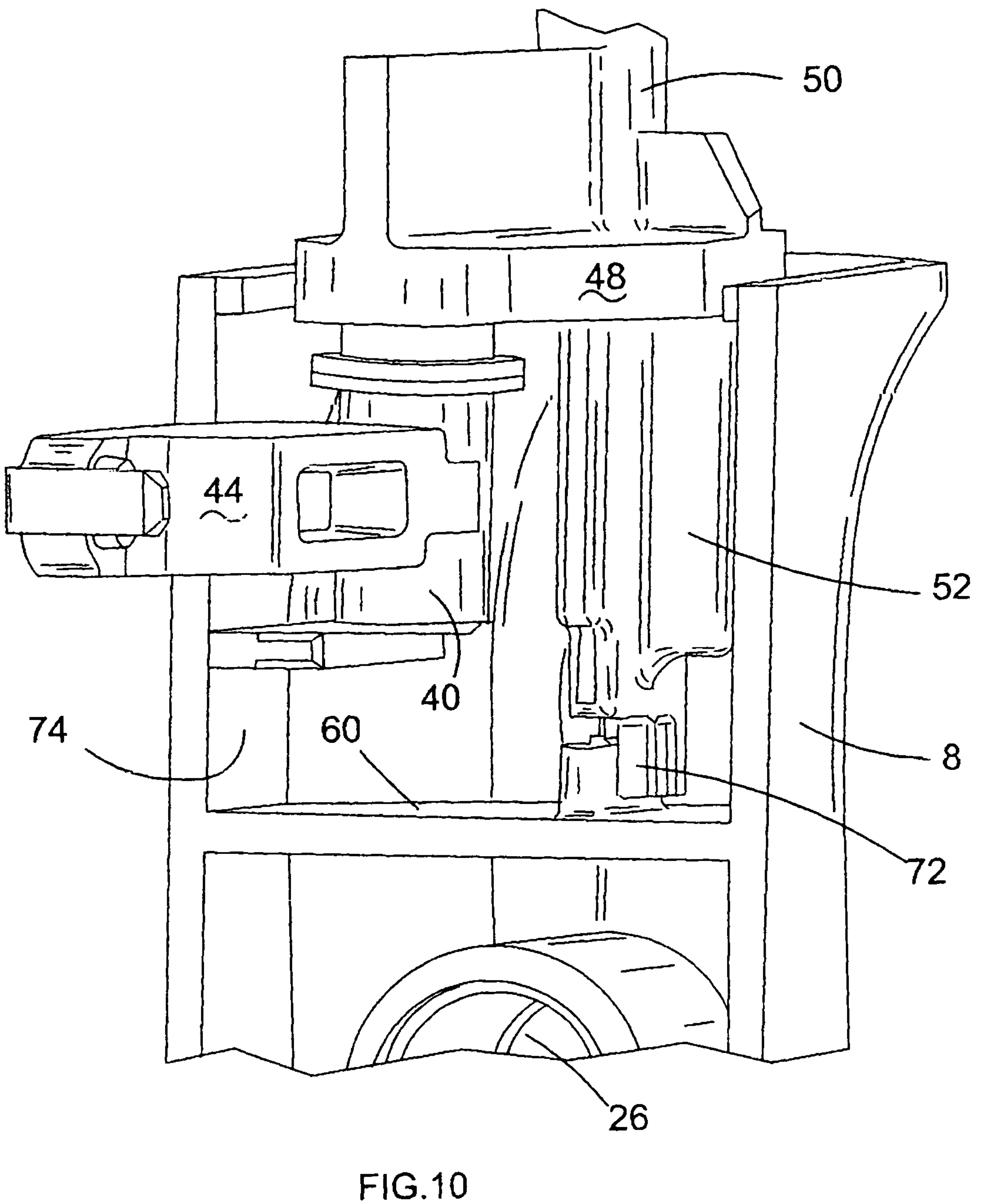
FIG. 10 shows the rear of the trigger button with the sliding “lock on” activator.
Figure 11:
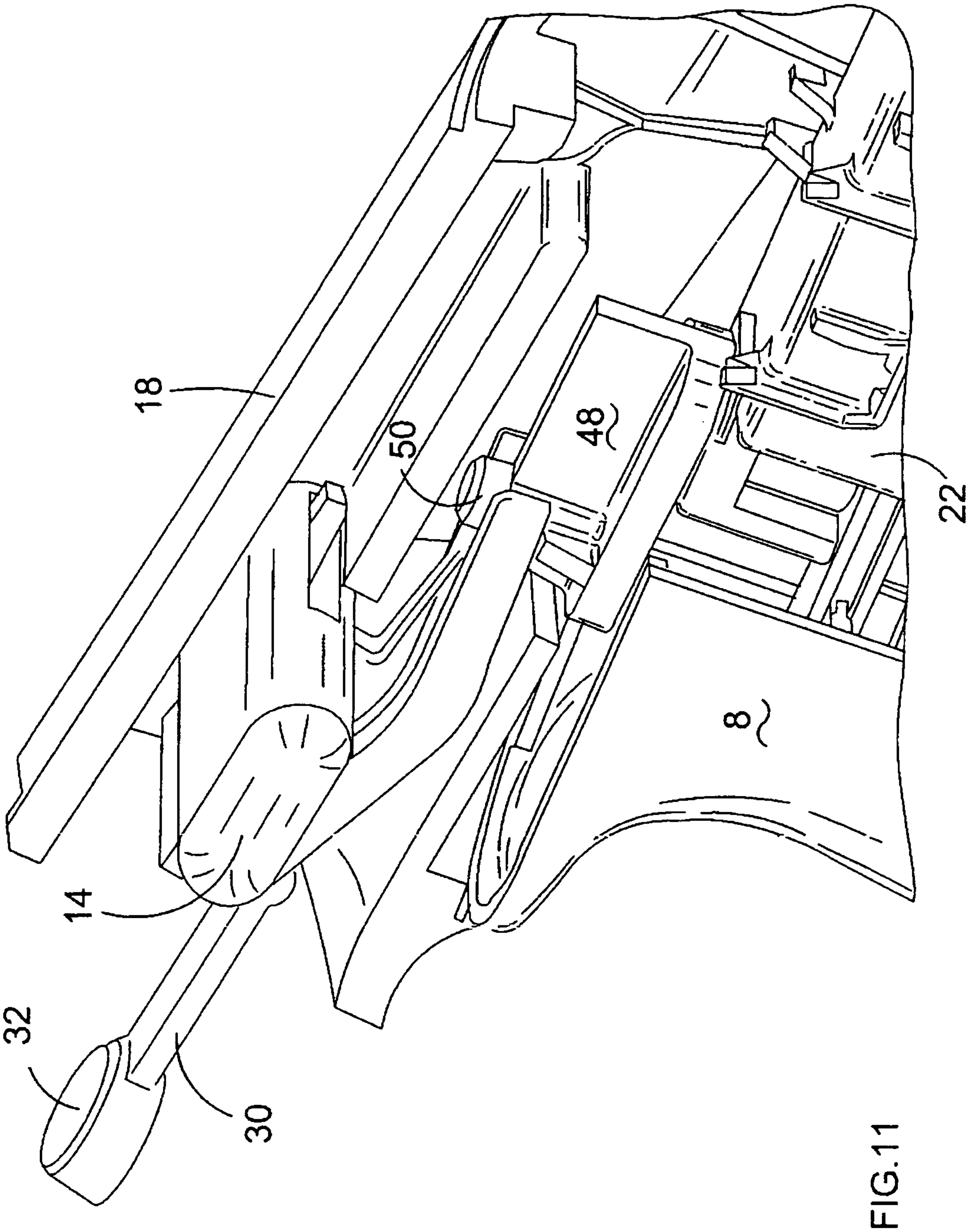
FIG. 11 shows part of the rear clam shell with the electric switch, the pivotal latch and the sliding “lock on” activator.

Formed on the bottom end of the latch arm 52 is a stop 72 as shown in FIG. 9. When the pivotal latch 38 is mounted on the electrical switch, the latch arm 52 extends into the inside space of the trigger button 8 formed by the inner walls 74 of the trigger button 8 and the shelf 60. When the pivotal latch 38 is pivoted due to the sliding movement of the bar 28 of the "lock on" activator 10, the latch arm 52 pivots inside the trigger button. The height of the stop 72 within the trigger button 8 is a same as that of the catch 62 such that pivotal movement of the latch arm 52 causes the stop 72 to engage with the side of the catch 62.

When the chipper is switched off with trigger button 8 located by its maximum amount away from the electrical switch 22, the latch arm 52 is located to the right to the catch 62 as shown in FIG. 8 such that it is on the opposite sides to the elongate ridge 64 of the catch 62 to that of smaller ridge 66. In this position, the "lock on" mechanism is switched off and the chipper only operates in the first mode of operation. When an operator tries to pivot the latch arm 52 by a sliding movement of the bar, the stop 72 engages the side of the catch thus preventing movement of the latch arm 38 and hence the pivotal latch 38. This in turn blocks the sliding movement of the "lock on" activator 10 and thus the bar which forms part of it. Thus the chipper is prevented from starting the second mode, namely the "lock on" mode whilst the chipper is switched off.

When the trigger button 8 is depressed, the trigger button 8, together with the catch 62, is move towards the electrical switch 22. However the latch arm 52 remains stationary as it is mounted on the electrical switch 22. Thus the relative position of the latch arm 52 within the trigger button 8 moves. When the trigger button has been depressed sufficiently, the catch 62 will move sufficiently towards the electrical switch 22 that the stop 72 of the latch alarm 52 is able to pass around the forward end of the catch 62. At this point, the operator can slidingly move the bar 28 causing the pivotal latch 38 to pivot against the biasing force of the spring 46 causing the latch arm 52 to pivot within the inside of the trigger button 8 around the top end of the catch. Upon release of the trigger button 8 whilst the latch arm 52 is in this position, the stop 72 locates within the recess 70 of the catch 62 thus preventing the trigger button 8 from returning to its opposition. Whilst the stop 72 remains in this position, the trigger button 8 is held in an inward position thus maintaining the chipper activated in the second mode of operation, with the electrical switch constantly activated even when the operator removes the fingers from the trigger button 8. The latch arm 52 is prevented from pivoting backwards due to the biasing force of the spring 46 by the stop 72 being held within the recess 70.

In order to release the "lock on", the operator depresses the trigger button 8 which moves the stop 72 from the recess 70. This allows the latch arm 52 to pivot across the top of the catch 62 due to the biasing force of the spring 46 (unless it is held there by the operator preventing the bar from moving position) and locate on the right of the catch as shown in FIG. 8. Then, upon release the trigger button 8, the trigger button 8 can move to allow electrical switch 22 to be switched off.

The invention claimed is:

1. A hammer drill comprising:

a body 2 having at least one support handle 4;

an electric motor mounted within the body 2;

an electric switch 22, capable of being switched on and off by a trigger button 8 connected to it, to activate or deactivate respectively the electric motor, wherein the trigger button 8 is moveable between two positions, a first position where the electric switch 22 is off and a second position where the electric switch 22 is on;

a locking arm 38 moveably mounted on the electric switch 22 which, when the trigger button 8 is located in its second position, is moveable between two positions, a first position where it is disengaged from the trigger button 8 and a second position where it engages with the trigger button 8 and holds the trigger button 8 in its second position; and wherein the locking arm is held in the locking arm first position and prevented from moving to the locking arm second position when the trigger button is located in the trigger button first position.

2. A hammer drill as claimed in claim 1 wherein the trigger button 8 slides linearly towards or away from the electric switch 22 when it travels between its two positions.

3. A hammer drill as claimed claim 1 wherein the trigger button 8 is urged towards its first position by a biasing force.

4. A hammer drill as claimed in claim 3 and wherein, when the trigger button is in its second position and the locking arm is in its second position, the locking arm is held in its second position and is prevented from moving to its first position by the biasing force acting on the trigger button and urging the trigger button towards its first position.

5. A hammer drill as claimed in claim 4 wherein the locking arm 38 is capable of being moved to its first position as a result of an external force applied to the trigger button 8 which overcomes the biasing force acting on the trigger button 8.

6. A hammer drill as claimed in claim 1 wherein the locking arm 38 is biased to its first position.

7. A hammer drill as claimed in claim 1 wherein the trigger button 8 comprise a catch 62 which engages with a stop part 72 of the locking arm 38 when it is in its second position.

8. A hammer drill as claimed claim 1 wherein the locking arm 38 is pivotally mounted on the electric switch and pivots between a right position and a left position.

9. A hammer drill as claimed in claim 8 wherein there is further provided a lock on activator 10 mounted in a linear slidable manner within one of the body 2 and the handle 4, which activator engages with the locking arm 38 so that, a linear sliding movement of the lock on activator results in pivotal movement of the locking arm.

10. A hammer drill comprising:

a body having at least one support handle;

an electric motor mounted within the body;

an electric switch, capable of being switched on and off by a trigger button connected to it, to activate or deactivate respectively the electric motor, wherein the trigger button is moveable between two positions, an off-position where the electric switch is off and an on-position where the electric switch is on;

a locking arm moveably mounted on the electric switch which, when the trigger button is located in its second position, is moveable between two positions, a disengaged position where it is disengaged from the trigger button and a locked position where it engages with the trigger button and holds the trigger button in its on-position; and wherein the locking arm is held in the disengaged position and prevented from moving to the locked position when the trigger button is located in the off-position.

11. A hammer drill as claimed in claim 10 and wherein the movement of the trigger button is along a first axis and the movement of the locking arm is substantially perpendicular to the first axis.

12. A hammer drill as claimed in claim 10 wherein the locking arm is biased to the disengaged position.

13. A hammer drill as claimed in claim 10 and wherein the trigger button is urged towards its off-position by a biasing element, and when the trigger button is in the on-position and the locking arm is in the locked position, the locking arm is held in the locked position and is prevented from moving to the disengaged position by the biasing element acting on the trigger button and urging the trigger button towards the off-position.

14. A hammer drill as claimed in claim 13 wherein the locking arm is movable to the disengaged position when an external force is applied to the trigger button and overcomes the biasing element acting on the trigger button.

15. A hammer drill as claimed in claim 10 wherein the trigger button comprise a catch which engages with a stop part of the locking arm when it is in the on-position.

16. A hammer drill as claimed claim 10 wherein the locking aim is pivotally mounted on the electric switch and pivots between a right position and a left position.

17. A hammer drill as claimed in claim 16 wherein there is further provided a lock on activator mounted in a linear slidable manner within one of the body and the handle, which activator engages with the locking arm so that a linear sliding movement of the lock on activator results in pivotal movement of the locking arm.

* * * * *